US012030405B2

(12) United States Patent
Wake et al.

(10) Patent No.: US 12,030,405 B2
(45) Date of Patent: Jul. 9, 2024

(54) UNMANNED AERIAL VEHICLE

(71) Applicant: NILEWORKS INC., Tokyo (JP)

(72) Inventors: Chihiro Wake, Tokyo (JP); Hiroshi Yanagishita, Tokyo (JP)

(73) Assignee: NILEWORKS INC., Tokyo (JP)

( * ) Notice: Subject to any disclaimer, the term of this patent is extended or adjusted under 35 U.S.C. 154(b) by 932 days.

(21) Appl. No.: 17/041,557

(22) PCT Filed: Mar. 26, 2019

(86) PCT No.: PCT/JP2019/012684
§ 371 (c)(1),
(2) Date: Nov. 17, 2020

(87) PCT Pub. No.: WO2019/189075
PCT Pub. Date: Oct. 3, 2019

(65) Prior Publication Data
US 2021/0309122 A1  Oct. 7, 2021

(30) Foreign Application Priority Data

Mar. 28, 2018 (JP) .................................. 2018-061882

(51) Int. Cl.
*B60L 58/22* (2019.01)
*B60L 58/13* (2019.01)
(Continued)

(52) U.S. Cl.
CPC .............. *B60L 58/22* (2019.02); *B60L 58/13* (2019.02); *B64C 39/024* (2013.01); *B64D 1/18* (2013.01);
(Continued)

(58) Field of Classification Search
CPC ...... B60L 58/22; B60L 58/13; B60L 2200/10; B60L 3/0046; B64C 39/024; B64D 1/18;
(Continued)

(56) References Cited

U.S. PATENT DOCUMENTS

| 11,387,515 B2* | 7/2022 | Yang ..................... B60L 53/80 |
| 2016/0039300 A1* | 2/2016 | Wang .................... B64D 27/24 |
| | | 244/58 |

(Continued)

FOREIGN PATENT DOCUMENTS

| CN | 107074367 A | 8/2017 |
| JP | 2001-120151 A | 5/2001 |

(Continued)

OTHER PUBLICATIONS

International Search Report of PCT/JP2019/012684 dated Jun. 25, 2019.

(Continued)

*Primary Examiner* — Stacy Whitmore
(74) *Attorney, Agent, or Firm* — MATTINGLY & MALUR, PC

(57) ABSTRACT

An unmanned aerial vehicle and a battery, possible to be disabled when a phenomenon to cause a functional disorder, are provided. The battery includes a battery pack having a battery cell, sensors detecting a phenomenon that impairs a function of the battery pack, a memory storing a detection signal of the sensors, and block circuits blocking output of the battery pack by the detection signal. The unmanned aerial vehicle includes the battery and air frame side sensors, and operates the block circuit, which the battery includes, by the detection signal of the airframe side sensors.

17 Claims, 11 Drawing Sheets

(51) Int. Cl.
*B64C 39/02* (2023.01)
*B64D 1/18* (2006.01)
*B64D 27/24* (2024.01)
*B64D 45/00* (2006.01)
*B64U 10/13* (2023.01)
*B64U 50/19* (2023.01)
*B64U 101/60* (2023.01)

(52) U.S. Cl.
CPC .......... *B64D 27/24* (2013.01); *B60L 2200/10* (2013.01); *B64D 2045/0085* (2013.01); *B64U 10/13* (2023.01); *B64U 50/19* (2023.01); *B64U 2101/60* (2023.01)

(58) Field of Classification Search
CPC ............ B64D 27/24; B64D 2045/0085; B64U 10/13; B64U 50/19; B64U 2101/60; B64U 2101/00; Y02T 10/70
See application file for complete search history.

(56) References Cited

U.S. PATENT DOCUMENTS

| 2017/0225781 | A1* | 8/2017 | Almasoud | G07C 5/08 |
| 2017/0313433 | A1* | 11/2017 | Ozaki | B64D 27/24 |
| 2018/0129210 | A1* | 5/2018 | Achtelik | G06V 20/188 |
| 2018/0134379 | A1* | 5/2018 | Sugaki | B64C 27/08 |

FOREIGN PATENT DOCUMENTS

| JP | 2006-82774 A | 3/2006 |
| JP | 2016-88111 A | 5/2016 |
| JP | 2017-109512 A | 6/2017 |
| JP | 2017-163265 A | 9/2017 |
| JP | 2018-20719 A | 2/2018 |

OTHER PUBLICATIONS

Chinese Office Action received in corresponding Chinese Application No. 201980011121.7 dated Jun. 8, 2023.

* cited by examiner

UNMANNED AERIAL VEHICLE

TECHNICAL FIELD

The present invention relates to an unmanned aerial vehicle with improved safety.

BACKGROUND ART

The use of unmanned aerial vehicles (hereinafter also referred to as "drones") is in progress. One of the important fields of use of drones is the spraying of chemicals such as pesticides and liquid fertilizers on farmland, that is, farm fields (for example, see Patent Literature 1). In Japan where farmland is smaller than in the Europe and the U.S., the chemical spraying by drones are more suitable than the chemical spraying by manned airplanes and helicopters in many cases.

By using technologies such as a Quasi-Zenith Satellite System (QZSS) and an RTK-GPS, a drone can accurately know the absolute position of the own plane in centimeters during flight. Thus, even in the typical small and complex farmland in Japan, autonomous flight reduces manual maneuvering and enables efficient and accurate chemical spraying.

On the other hand, it is necessary to consider safety, for example, for autonomous drones used for spraying agricultural chemicals or the like. Since a drone loaded with chemicals weighs several tens of kilograms, the case of an accident such as falling onto a person may have serious consequences. Further, the operator of a drone is not an expert on drones, so therefore a foolproof mechanism is required to ensure safety even for non-experts. Until now, there have been drone safety technologies based on human control (for example, see Patent Literature 2), but there was no technology for addressing safety issues specific to autonomous drones for spraying agricultural chemicals.

Drones are generally driven by a motor, and a battery is installed as a power source to drive the motor. Therefore, in the drone in which safety is strictly required as described above, it is required that the drone can be safely evacuated even in a case where a trouble occurs in the battery or the amount of stored electricity decreases.

The drone incorporates devices for controlling a flight direction, a flight speed, a flight height, an attitude, and various other things and wiring connecting them. When an abnormality occurs in these devices or wiring, the normal operation of the drone may not be maintained. However, even when such an abnormality occurs, it is required to be able to evacuate safely.

CITATION LIST

Patent Literature

Patent Literature 1: JP 2001-120151 A
Patent Literature 2: JP 2017-163265 A

SUMMARY OF INVENTION

Technical Problem

An object of the invention is to provide an unmanned aerial vehicle in which even when an abnormality occurs in a battery, an internal circuit of an airframe, or the like, safety can be ensured by providing so-called "redundancy" and by performing an emergency evacuation operation.

Solution to Problem

An unmanned aerial vehicle according to the present invention is
an unmanned aerial vehicle which is driven by an electric motor.
The unmanned aerial vehicle includes: a plurality of batteries which are provided as a drive power source for the electric motor.
The plurality of batteries are connected in parallel, and each battery has a monitoring unit which detects an abnormality or deterioration of the battery.
When a detection signal is output from the monitoring unit, an operation is switched to an emergency evacuation operation.
The unmanned aerial vehicle according to the present invention further includes:
a plurality of propellers; a plurality of electric motors which individually rotate and drive the respective propellers; a battery which is a power supply source for each electric motor; a distribution unit which adjusts a power of the battery to an appropriate voltage and distributes the power to the electric motors; and a flight controller which controls the distribution unit according to a command and flies the vehicle according to a command.
The distribution unit is configured to be a pair of two distribution units, and
the flight controller monitors an operation of the two distribution units and switches the operation to the emergency evacuation operation when an abnormality occurs in at least one of the distribution units.
The unmanned aerial vehicle according to the present invention further includes:
a plurality of propellers; a plurality of electric motors which individually rotate and drive the respective propellers; a battery which is a power supply source for each electric motor; a distribution unit which adjusts a power of the battery to an appropriate voltage and distributes the power to the electric motors; and a flight controller which controls the distribution unit according to a command and flies the vehicle according to a command.
The flight controller is configured to be a pair of two flight controllers, and
the distribution unit monitors an operation of the two flight controllers and switches the operation to the emergency evacuation operation when an abnormality occurs in at least one of the flight controllers.

Advantageous Effects of Invention

According to the unmanned aerial vehicle according to the present invention, even when an abnormality occurs in one battery, another battery complements the battery. Further, even when an abnormality occurs in the internal circuit of the unmanned aerial vehicle, another internal circuit complements the internal circuit. Further, when an abnormality occurs in the battery or the internal circuit, the operation is switched to the emergency evacuation operation to prevent the development of a trouble which damages safety.

DESCRIPTION OF EMBODIMENTS

Hereinafter, an embodiment of an unmanned aerial vehicle according to the present invention, that is, a drone will be described with reference to the drawings. The illustrated embodiment is an example of a drone which is assumed to be used for agricultural purposes, but the purpose of the drone is not limited to this.

Embodiment

[Overview of Unmanned Aerial Vehicle (Drone)]

In this description, a drone is defined as a general flight vehicle having multiple rotor blades or flight units. It does not matter whether a power means is an electric motor or a prime mover or the like. It does not matter whether an operating system is wireless or wired, and autonomous type or manual flight type.

Figure 10:
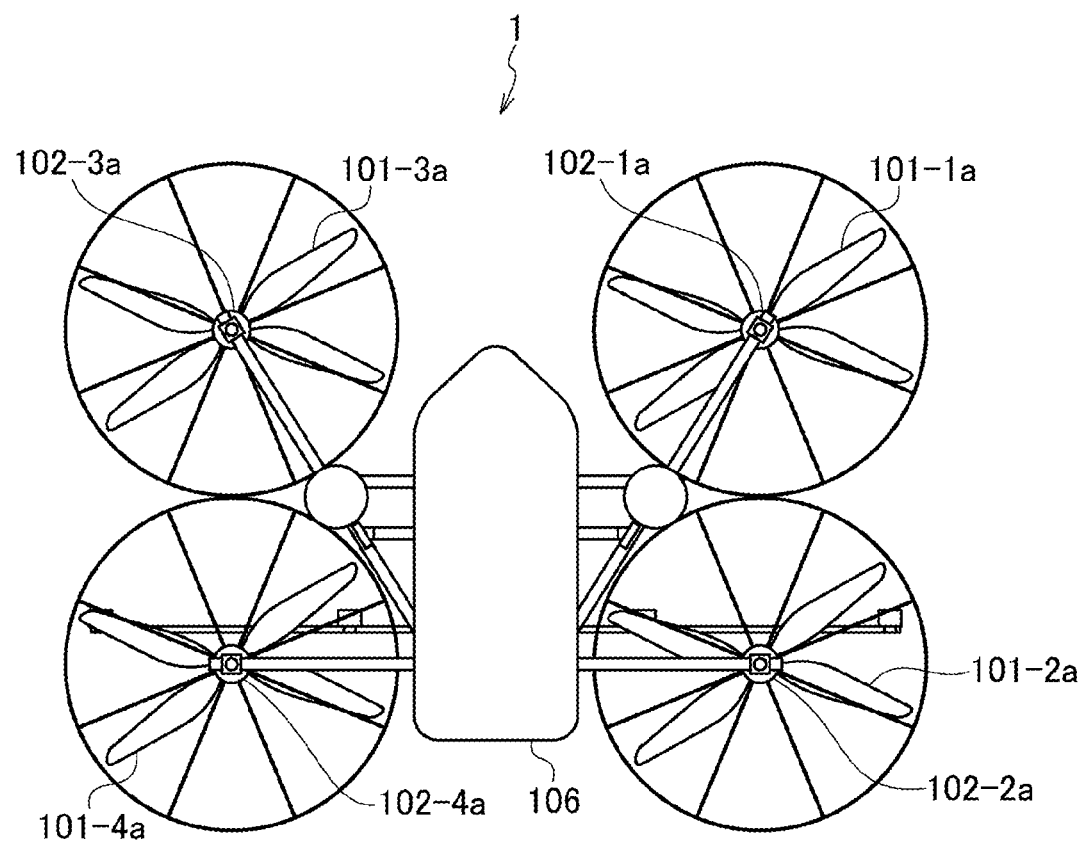
FIG. 10 is a plan view illustrating an example of an appearance of the drone.
Figure 11:
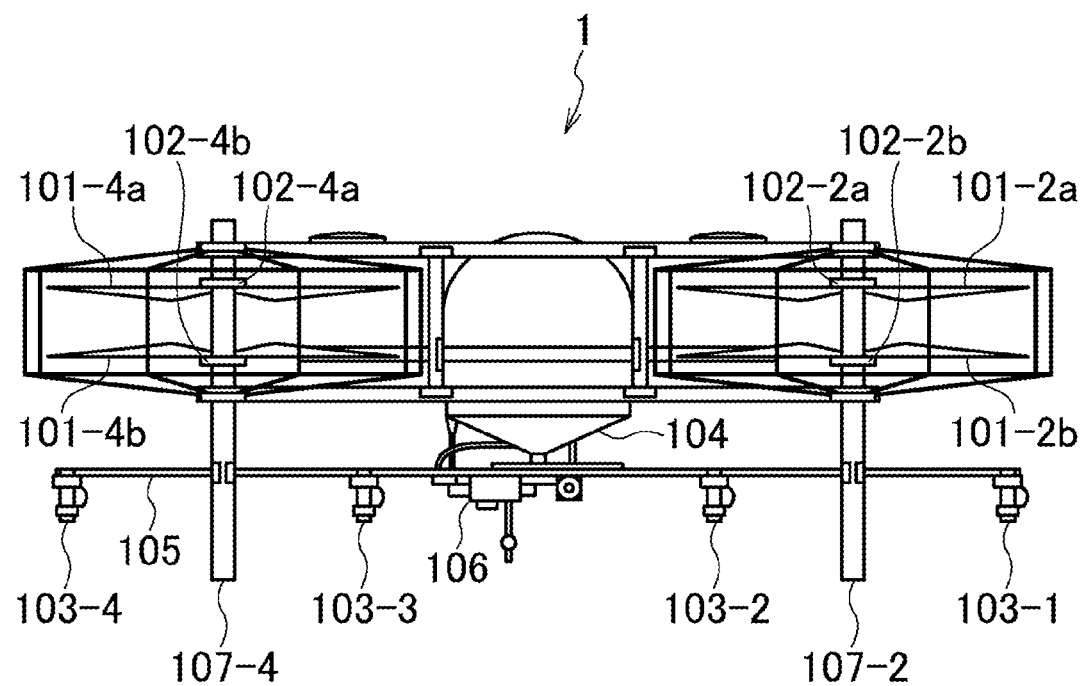
FIG. 11 is a front view illustrating the example of the appearance of the drone.
Figure 12:
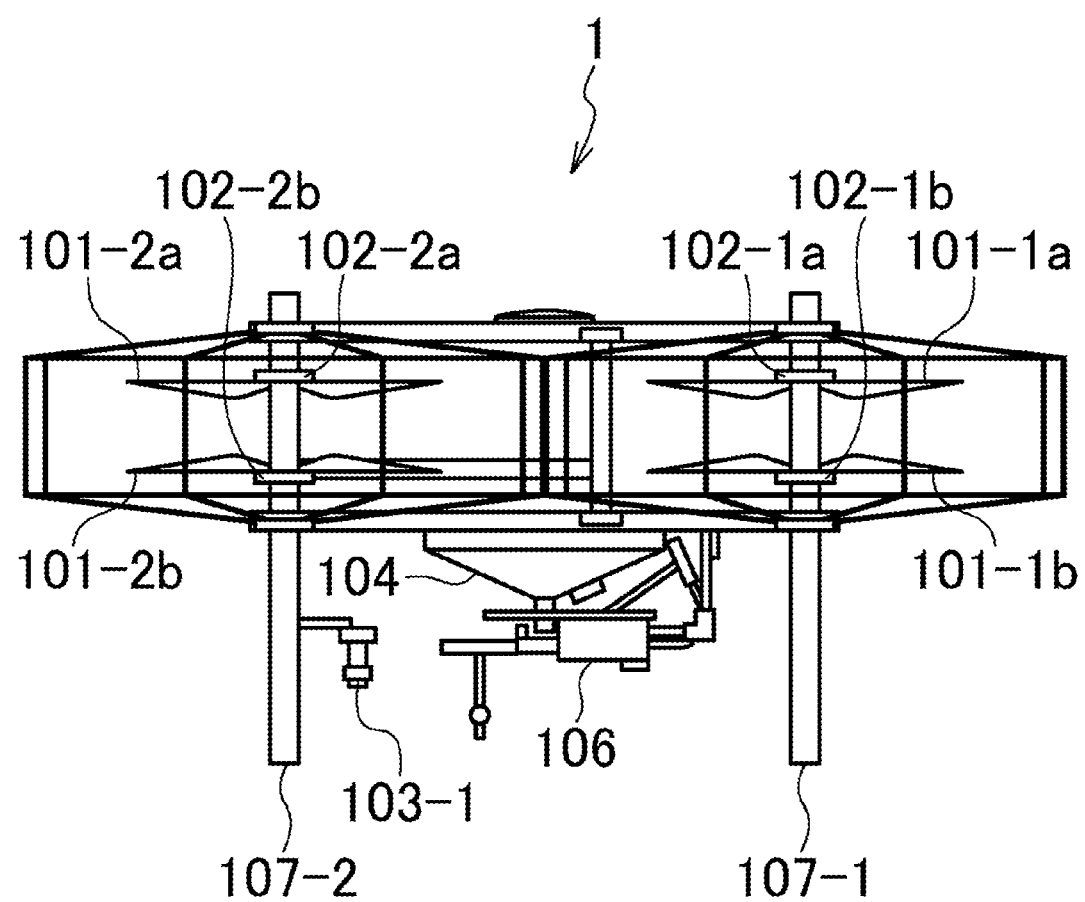
FIG. 12 is a right side view illustrating the example of the appearance of the drone.

In FIGS. 10 to 12, eight rotor blades 101-1a, 101-1b, 101-2a, 101-2b, 101-3a, 101-3b, 101-4a, and 101-4b which are also called rotors or propellers are provided as units for flying a drone 1. Four sets of two-stage rotor blades, that is, total eight rotor blades are provided in consideration of the balance of flight stability, airframe size, and battery consumption.

Eight motors 102-1a, 102-1b, 102-2a, 102-2b, 102-3a, 102-3b, 102-4a, and 102-4b are provided as units which individually rotate and drive the rotor blades respectively. The driving means of the rotor blade is typically an electric motor but may be a motor such as a gasoline engine. The upper and lower rotor blades and the motors corresponding thereto in one set have axes on the same straight line for the flight stability or the like of the drone 1. One set of upper and lower rotor blades are rotationally driven in opposite directions and generate upward thrust together. Incidentally, although the rotor blade 101-3b and the motor 102-3b are not illustrated, their positions are obvious, and the rotor blade and the motor are placed at positions shown if there is a left side view.

Chemical nozzles 103-1, 103-2, 103-3, and 103-4 are units for spraying chemicals downward. Incidentally, the chemicals are referred to as liquids or powders sprayed on farm field such as pesticides, herbicides, liquid fertilizers, insecticides, seeds, and water.

A chemical tank 104 is a tank for storing chemicals to be sprayed, and is provided at a position close to the center of gravity of the drone 1 and lower than the center of gravity from the viewpoint of weight balance. Chemical hoses 105 are units for connecting the chemical tank 104 with respective chemical nozzles 103-1, 103-2, 103-3, and 103-4. The chemical hoses 105 are made of a hard material and may also serve to support the respective chemical nozzles. A pump 106 is a unit for discharging the chemicals from the nozzle.

Figure 9:
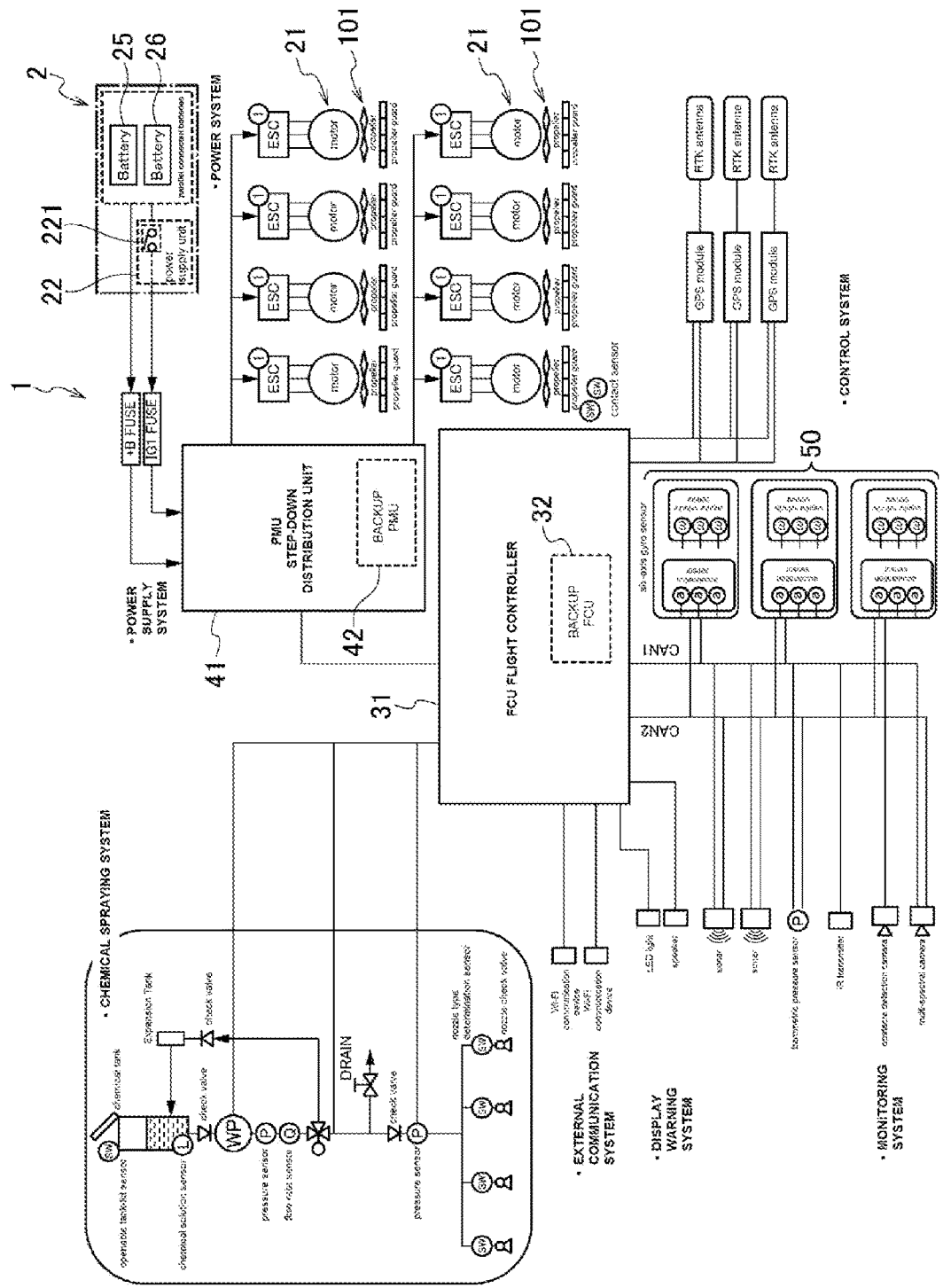
FIG. 9 is an electrical control system diagram of a drone as the unmanned aerial vehicle according to the present invention.

FIG. 9 illustrates an overall conceptual diagram of a system where the drone 1 according to the above embodiment is used for chemical spraying. In the following description, the parts related to the present invention will be mainly described, and the description of other parts will be omitted. Further, in order to avoid the complexity of the reference signs, the eight motors are indicated in common by reference sign 21 and the eight rotor blades are indicated in common by reference sign 101.

In FIG. 9, the drone 1 can be equipped with a power supply system 2 which drives each motor 21. The power supply system 2 has two batteries 25 and 26 connected in parallel. The power supply system 2 is a unit which supplies power to a flight controller 31 and other components of the drone 1, and the batteries 25 and 26 are desirably rechargeable. The power supply system 2 is connected to a step-down electric unit 41 via a power supply control unit 22 and further via a fuse, a circuit breaker, or the like. The power supply system 2 has a function of transmitting the internal state such as the amount of stored electricity and accumulated usage time to the flight controller 31 in addition to a power supply function.

The power supply control unit 22 has a switch 221 which opens and closes a power supply line from the batteries 25 and 26, and a control unit (not illustrated) which controls the opening and closing of the switch 221. The switch 221 is normally controlled by the control unit to maintain an on state. The type of the switch 221 is not particularly limited and may be a mechanical switch such as a relay or a semiconductor switching element or the like. The power supply line is connected to the step-down electric unit 41 via a fuse, a circuit breaker, or the like. For example, the batteries 25 and 26 have a battery pack configured by a plurality of rechargeable battery cells of a lithium ion type.

Although not illustrated in FIG. 9, the power supply system 2 has a monitoring unit which detects deterioration or an abnormality in each of the batteries 25 and 26 and outputs a signal for each of the batteries 25 and 26. As the detection method of the monitoring unit, an arbitrary method may be selected from known methods of performing monitoring on the basis of the number of times of charge and discharge, an internal resistance, a relation between a temperature and a voltage of the battery, an impedance, a charge amount, and the like. Each of batteries 25 and 26 has a battery pack in which a plurality of battery cells are stacked in series. Each of the batteries 25 and 26 detects an abnormality in the battery cell of each battery pack and outputs a signal. This detection method may be used as the detection method of the monitoring unit. The power supply control unit 22 switches off the switch 221 when the detection signal of the monitoring unit is input.

Figure 8:
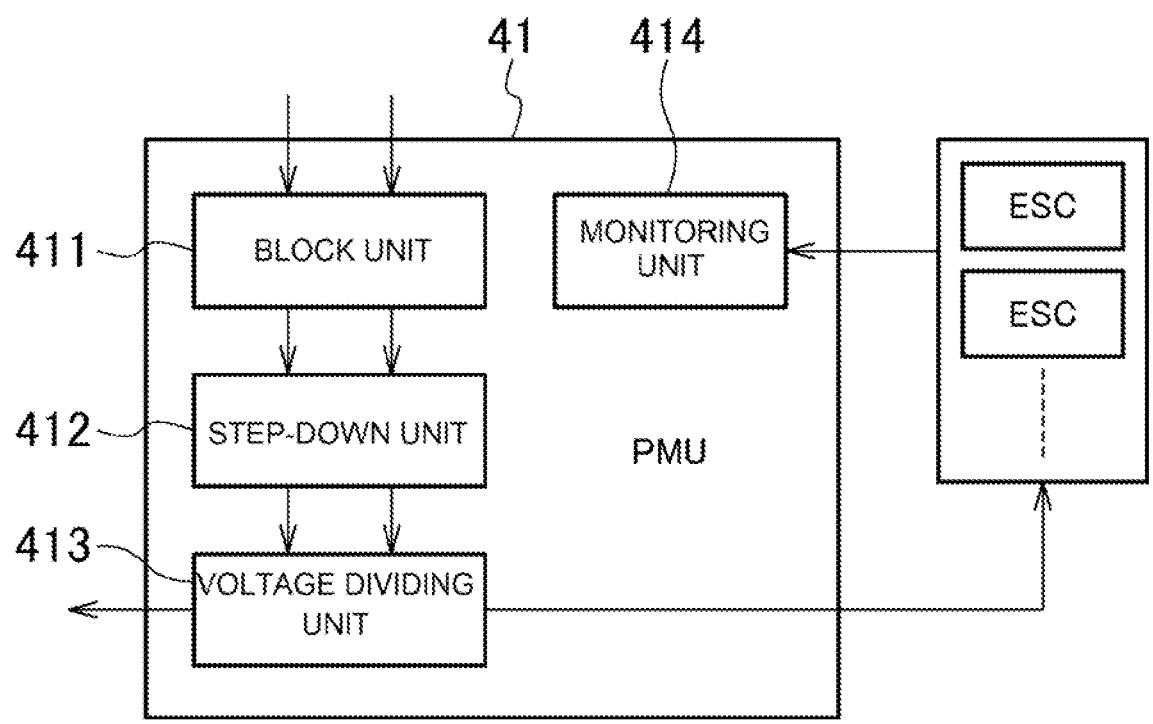
FIG. 8 is a functional block diagram illustrating an example of a step-down distributor in each of the above embodiments.

The step-down electric unit 41 distributes the power supplied from the power supply system 2 to each motor 21 and other circuit components and has a function to convert DC voltages from the batteries 25 and 26 into voltages suitable for each motor 21 and other circuit components and distribute the voltages. FIG. 8 illustrates an example of the step-down electric unit 41 which includes a cut-off unit 411, a step-down unit 412, a voltage dividing unit 413, and a monitoring unit 414. The step-down unit 412 steps down a relatively high voltage DC supplied from the power supply system 2 to a voltage suitable for supplying to the motor 21 and a DC voltage suitable for use in other parts in the drone 1. The cut-off unit 411 cuts off power supply in a case where there is an abnormality in the power supply system 2 or the like.

The monitoring unit 414 monitors an ESC described below and the flight controller 31. When a detection signal is output from the monitoring unit 414, this detection signal is input to the flight controller 31. Even in a case where the monitoring unit included in each of the batteries 25 and 26 detects an abnormality in each of the batteries 25 and 26, this detection signal is also input to the flight controller 31. When the above detection signal is input, the flight controller 31 switches the operation to the emergency evacuation operation as described later.

As illustrated in FIG. 9, a control unit such as an electronic speed control (ESC) is provided between the step-down electric unit 41 and each motor 21. The step-down electric unit 41 controls the current flowing through each motor 21 via each ESC in response to a command from the flight controller 31 which will be described later. With this control, the rotation of the individual motors 21 is controlled to control the takeoff and landing, ascent and descent, forward and backward movement, speed of the drone 1 and other flights necessary for the drone. A configuration is made such that the actual rotation speed of each motor 21 is fed back to the flight controller 31, and it is monitored whether or not a normal rotation is performed.

The step-down electric unit 41 includes a backup step-down electric unit 42 configured in the same manner as the step-down electric unit 41. The two step-down electric units 41 and 42 are paired. The operation of the step-down electric units 41 and 42 is monitored by the flight controller 31, and when an abnormality occurs in at least one of the step-down electric units, the operation is switched to the emergency evacuation operation by the command of the flight controller 31. The details of the emergency evacuation operation will be described later.

In FIG. 9, the flight controller 31 is a component which controls the entire drone, and specifically may be an embedded computer including a CPU, a memory, related software, and the like. The flight controller 31 inputs a control signal to the step-down electric unit 41 on the basis of the input information received from a remote controller and the input information from various sensors.

Desirably, the flight controller 31 interacts with the remote controller via a Wi-Fi slave unit function and further via a base station so as to receive a necessary command from the remote controller and transmit necessary information to the remote controller. It is desirable to encrypt the communication so as to prevent illegal acts such as interception, spoofing, and hijacking of equipment. The base station desirably has an RTK-GPS base station function in addition to a Wi-Fi communication function. By combining a signal from the RTK base station and a signal from a GPS positioning satellite, the absolute position of the drone 1 can be measured with an accuracy of about several centimeters.

The flight controller 31 individually controls the rotation of each motor 21 which drives each rotor blade 101 via the step-down electric unit 41 and each ESC, and causes the drone 1 to perform operations required as a drone such as takeoff and landing, forward movement, backward movement, ascent, descent, movement to right and left, and hovering.

The drone 1 has a six-axis sensor 50 for performing the above-described various movements and attitude controls. The six-axis sensor 50 has an acceleration sensor which detects accelerations in three axial directions orthogonal to each other and an angular velocity sensor which detects angular velocities of rotations, for example, pitching, rolling, and yawing, around the above three axes.

The software used by the flight controller 31 is rewritable through a storage medium or the like for function expansion/change, problem correction, or the like, or through communication means such as Wi-Fi or USB. In this case, it is desirable that the protection by encryption, checksum, electronic signature, virus check software, and the like prevent rewriting performed by unauthorized software. In addition, a part of a calculation process used in the control by the flight controller 31 may be executed by another computer existing on the remote controller, the farm cloud, or another place.

Since the flight controller 31 is a highly important part that can also be called the center of the drone, some or all of its components are duplicated. In the example illustrated in FIG. 9, in order to back up one flight controller 31, a flight controller 32 having the same configuration as the flight controller 31 is provided. The two flight controllers 31 and 32 are paired, and one flight controller monitors whether or not another flight controller is operating normally. In addition, whether or not the flight controllers 31 and 32 are operating normally is monitored by the monitoring unit 414 (see FIG. 8) of the step-down electric units 41 and 42. When an abnormality occurs in at least one flight controller, the operation of the other flight controller is switched to be valid, and the operation is switched to the emergency evacuation operation.

The overall configuration of the embodiment of the unmanned aerial vehicle according to the present invention has been described above. Next, some feature parts of the embodiment will be described.

First Embodiment

Figure 1:
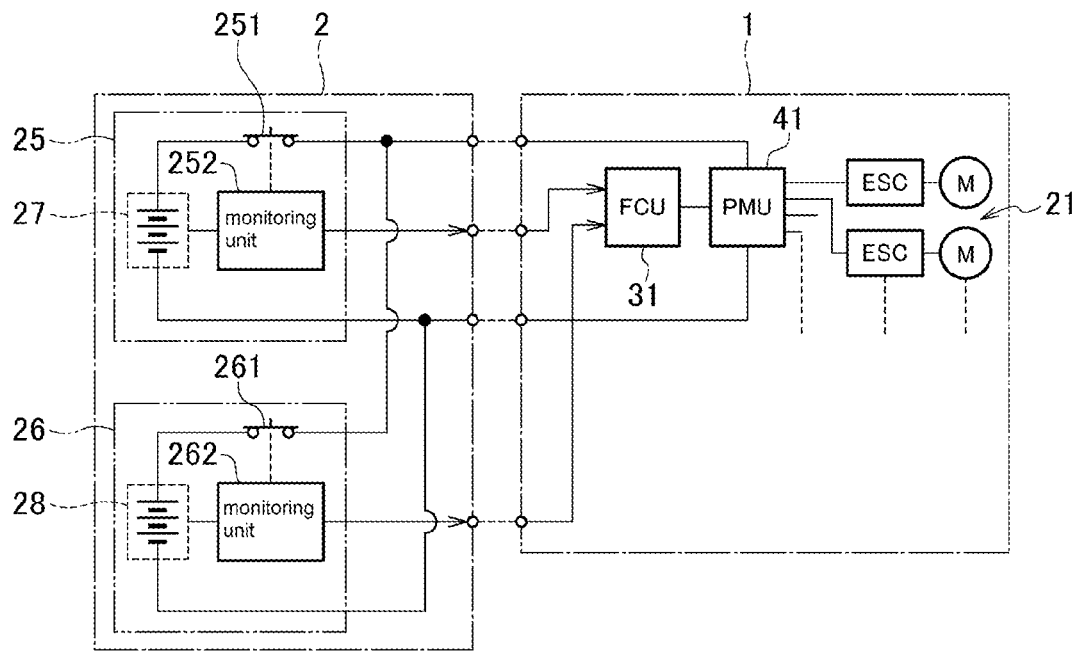
FIG. 1 is a block diagram illustrating a first embodiment of an unmanned aerial vehicle according to the present invention.

FIG. 1 illustrates a first embodiment. In FIG. 1, the power supply system 2 has a pair of two batteries 25 and 26. The batteries 25 and 26 has battery packs 27 and 28, monitoring units 252 and 262, and switches 251 and 261 for opening and closing the power supply line from the battery packs 27 and 28, respectively. The monitoring units 252 and 262 detect an abnormality or deterioration of the battery packs 27 and 28 for respective battery packs 27 and 28 by the above-described appropriate detection method. The switch 251 is turned off by the abnormality detection signal from the battery pack 27 to cut off the power supply line from the battery pack 27. The switch 261 is turned off by the abnormality detection signal from the battery pack 28 to cut off the power supply line from the battery pack 28.

When the operation state of the monitoring units 252 and 262, that is, the operation state of the switches 251 and 261 is displayed by blinking an indicator light, an abnormality or deterioration of the batteries 25 and 26 can be detected by the inspection before the drone is in operation, and the safety of drones is improved.

In a case where the battery packs 27 and 28 of the power supply system 2 are configured of, for example, a lithium-ion battery, when an impact force is applied to change the structure of the battery cell, problems such as temperature rise and ignition may occur. The monitoring units 252 and 262 also detect impacts which cause such problems.

The battery packs 27 and 28 are connected in parallel to supply power to the drone 1, and the fact itself that the battery packs 27 and 28 are connected in parallel gives so-called redundancy to the power supply system 2. As described above, power is supplied from the power supply system 2 to the step-down electric unit 41 of the drone 1. The operation of the step-down electric unit 41 is controlled by the flight controller 31. The detection signals from two monitoring units 252 and 262 on the battery 2 side are input to the flight controller 31, and each of the battery pack 27 and 28 is monitored. When an abnormal signal is output from at least one of the battery packs 27 and 28, the flight controller 31 controls the operation of each motor 21 and switches the operation such that the drone 1 performs the emergency evacuation operation.

The features of the first embodiment are that the power supply system 2 is provided with redundancy and that the drone 1 performs the emergency evacuation operation in addition to the redundant operation of the power supply system 2. Hereinafter, these operations will be described together with the flowchart of FIG. 2. In the flowchart, operation steps are represented as S1, S2, and so on.

Figure 2:
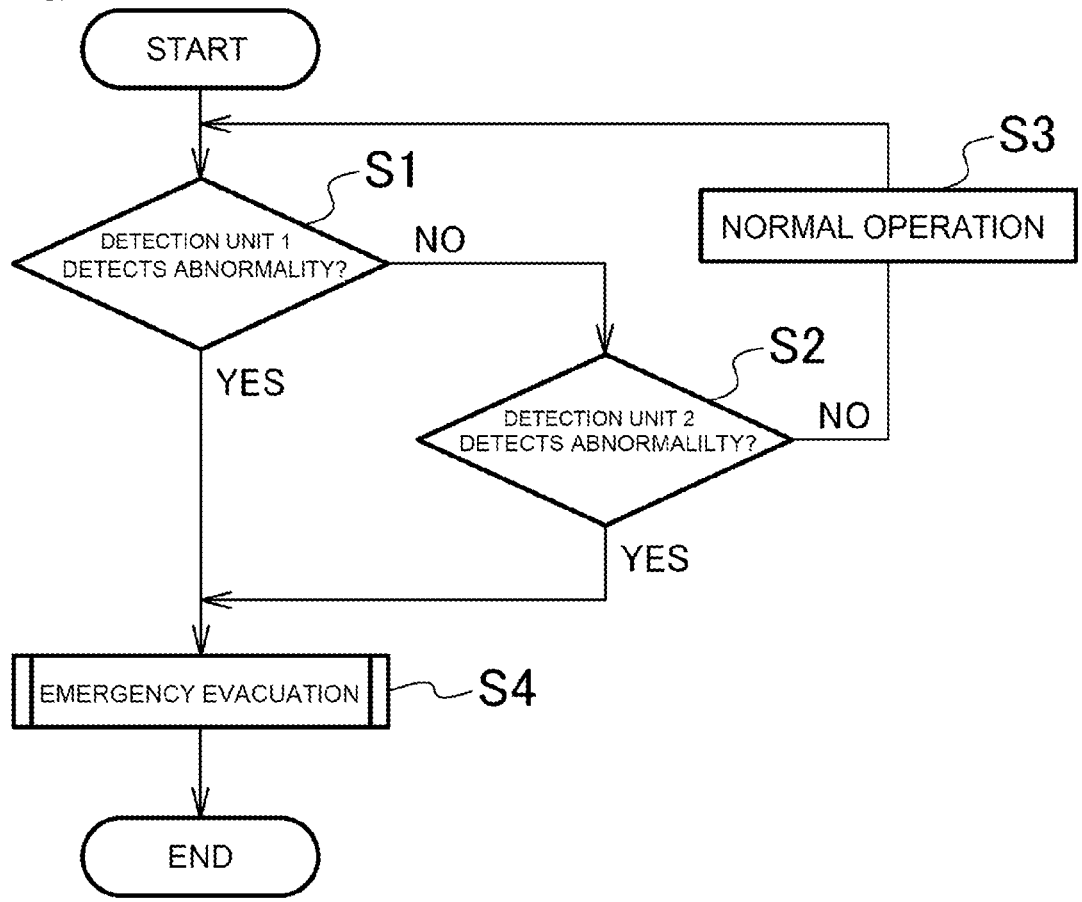
FIG. 2 is a flowchart illustrating an outline of an operation of the first embodiment.

As illustrated in FIG. 2, the monitoring units 252 and 262 of the two batteries 25 and 26 constantly detect an abnormality or deterioration of the respective battery packs 27 and 28 (S1 and S2). When both monitoring units 252 and 262 do not detect an abnormality, the drone 1 operates normally (S3). When at least one of the monitoring units 252 and 262 detects an abnormality, that is, an abnormality or deterioration of the battery packs 27 and 28, this detection signal is input to the flight controller 31, and the operation is switched to the emergency evacuation operation by the command of the flight controller 31 (S4).

Examples of the emergency evacuation operation include emergency return, emergency landing, and emergency stop. In the emergency evacuation operation, in the order of priority, that is, from the one with the lowest emergency to the one with the highest emergency, the emergency return, the emergency landing, and the emergency stop are performed in this order. When there is a slight abnormality or deterioration of the battery packs 27 and 28, the emergency return is performed. When there is a moderate abnormality or deterioration, the emergency landing is performed. When there is a serious abnormality or deterioration which makes the emergency return and the emergency landing difficult, the emergency stop, that is, drop or descend on the spot is performed.

The emergency return is to return to the pre-stored point of the flight controller such as the place of takeoff in the shortest distance. The user can inspect the drone 1 which has returned to the return point or a predetermined position or manually transport the drone to another place. The emergency landing is a landing in a predetermined place or a nearby safe place obtained by processing camera images. Depending on the degree of emergency, hovering, that is, stopping in the air or the like may be performed.

The emergency evacuation operation is also performed by a command from the flight controller 31 or the other flight controller 32. In the case of an agricultural drone, even in the case of the emergency stop which is the worst emergency evacuation, the drone descends or falls into a farm field, so as to avoid damaging a person.

For the batteries 25 and 26, when the monitoring units 252 and 262 detects an abnormality or deterioration of the batteries 25 and 26, the switches 251 and 261 is turned off. Power is supplied from one battery, and the other battery is installed as a spare. Therefore, when an abnormality detection signal is output from one battery, the output of that battery is cut off, and power is supplied to the drone 1 from the other battery. However, when an abnormality or deterioration is detected in one battery, the operation is switched to the above-described emergency evacuation operation with safety given top priority.

Second Embodiment

Figure 3:
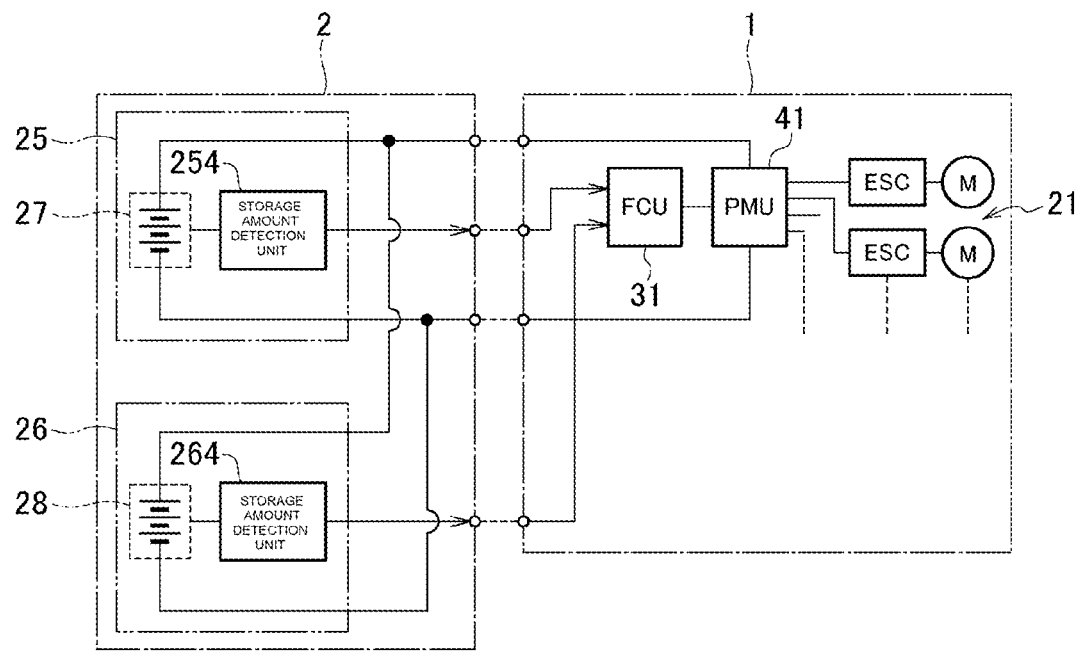
FIG. 3 is a block diagram illustrating a second embodiment of the unmanned aerial vehicle according to the present invention.

The monitoring units 252 and 262 may be the storage amount detection units of the respective battery packs 27 and 28, and when the storage amount detected by the storage amount detection unit of one battery falls below a predetermined amount, the operation may be switched to the emergency evacuation operation. Further, the emergency evacuation operation may be distinguished according to the amount of stored electricity. FIG. 3 illustrates the example thereof which is an embodiment in which the operation is switched to the emergency evacuation operation when the amount of electricity stored in at least one of the battery packs decreases. That is, in the second embodiment, the so-called redundancy is provided with respect to the decrease in the amount of electricity stored in the batteries 27 and 28.

Figure 4:
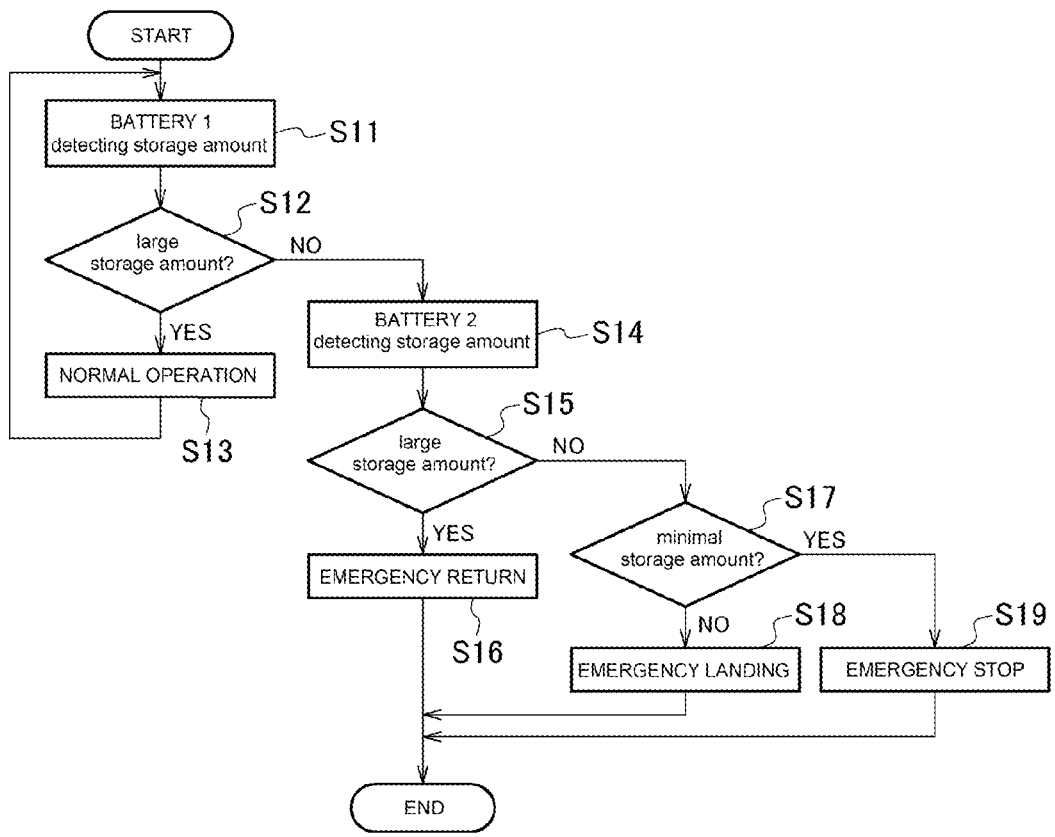
FIG. 4 is a flowchart illustrating an operation of the second embodiment.

In the second embodiment illustrated in FIG. 3, the two monitoring units 252 and 262 in the first embodiment are replaced with the storage amount detection units 254 and 264, respectively. Further, the switches 251 and 261 in the first embodiment are omitted. The operation of the second embodiment is illustrated in FIG. 4. In FIG. 4, one of the two batteries is indicated as "battery 1" and the other is indicated as "battery 2".

In FIG. 4, first, the amount of the electricity stored in one battery 1 is detected (S11), and it is determined whether or not the amount of stored electricity is large (S12). The criterion for whether the amount of stored electricity is large is whether the drone can perform normal operations. When the amount of stored electricity is large, a normal operation is performed (S13), and the process returns to step S11. When the amount of stored electricity is not large, the operation is switched to the following emergency evacuation operation.

In the emergency evacuation operation, the amount of the electricity stored in the other battery 2 is detected (S14), and it is determined whether or not the amount of electricity stored in the other battery 2 is large (S15). The criterion for whether the amount of stored electricity in this case is large is whether the drone can make the emergency return. When the amount of stored electricity is large, the emergency return is made (S16). When the amount of stored electricity is not large, it is determined whether the amount of stored electricity is extremely small (S17). The criterion for whether the amount of electricity stored is extremely small is whether or not the drone can make the emergency landing.

When the amount of stored electricity is not extremely small, that is, when a certain amount of electricity is left, the emergency landing is made (S18), and when the amount of stored electricity is extremely small, the emergency stop is made (S19).

In a case where the amount of electricity stored in one battery is small, and power is supplied from the other battery with a large amount of electricity for emergency return, the cargo of the drone may be abandoned, and a return is made. For example, a program may be configured such that in a case where an agricultural drone is caused to make the emergency return, the drone returns spraying chemicals to a predetermined farm field.

In addition to the monitoring units 252 and 262 provided corresponding to the batteries 27 and 28 in the first embodiment, the storage amount detection units 254 and 264 may be provided in the second embodiment.

Third Embodiment

Next, a third embodiment of the present invention will be described. In this embodiment, the storage amount detection unit of the second embodiment is provided, and an abnormality in the storage amount detection unit itself is detected to perform the emergency evacuation. Since the hardware configuration is the same as that of the second embodiment, only the operation flow illustrated in FIG. 5 will be described.

Figure 5:
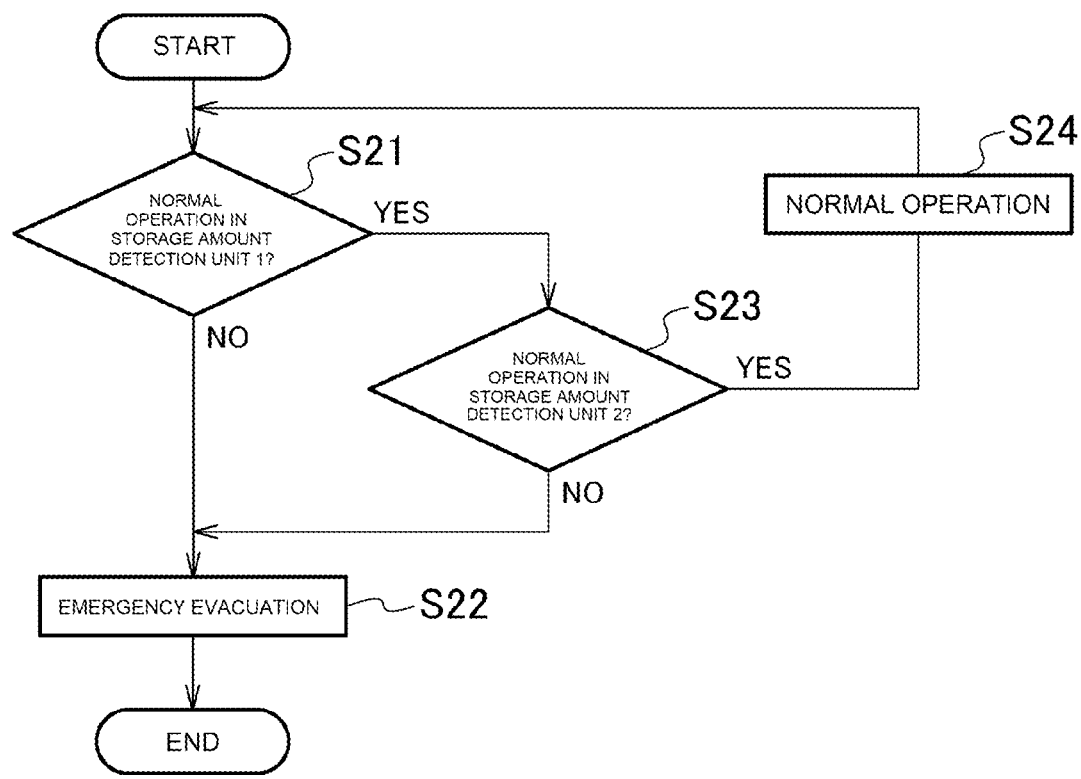
FIG. 5 is a flowchart illustrating an operation of a third embodiment of the unmanned aerial vehicle according to the present invention.

In FIG. 5, first, it is determined whether or not one of the storage amount detection units is operating normally (S21). This determination can also be made by any one of the flight controllers 31 and 32. When one storage amount detection unit is not operating normally, the operation is switched to the emergency evacuation operation (S22). When one storage amount detection unit is operating normally, it is determined whether or not the other storage amount detection unit is operating normally (S23). When the operation is performed normally, that is, when both storage amount detection units are operating normally, the normal operation as a drone is continued (S24), and the process returns to step S21. When the other storage amount detection unit is not operating normally, the operation is switched to the emergency evacuation operation (S22).

Fourth Embodiment

Although the battery is provided with the so-called redundancy in the embodiments described so far, it is desirable to provide redundancy on the airframe side of the drone as well. A fourth embodiment is the example thereof. The hardware configuration follows the configuration illustrated in FIG. 9, and the software configuration is characteristic. Thus, the operation flow thereof will be described together with FIG. 6. The fourth embodiment is an example in which the step-down electric unit (MPU) is provided with redundancy.

Figure 6:
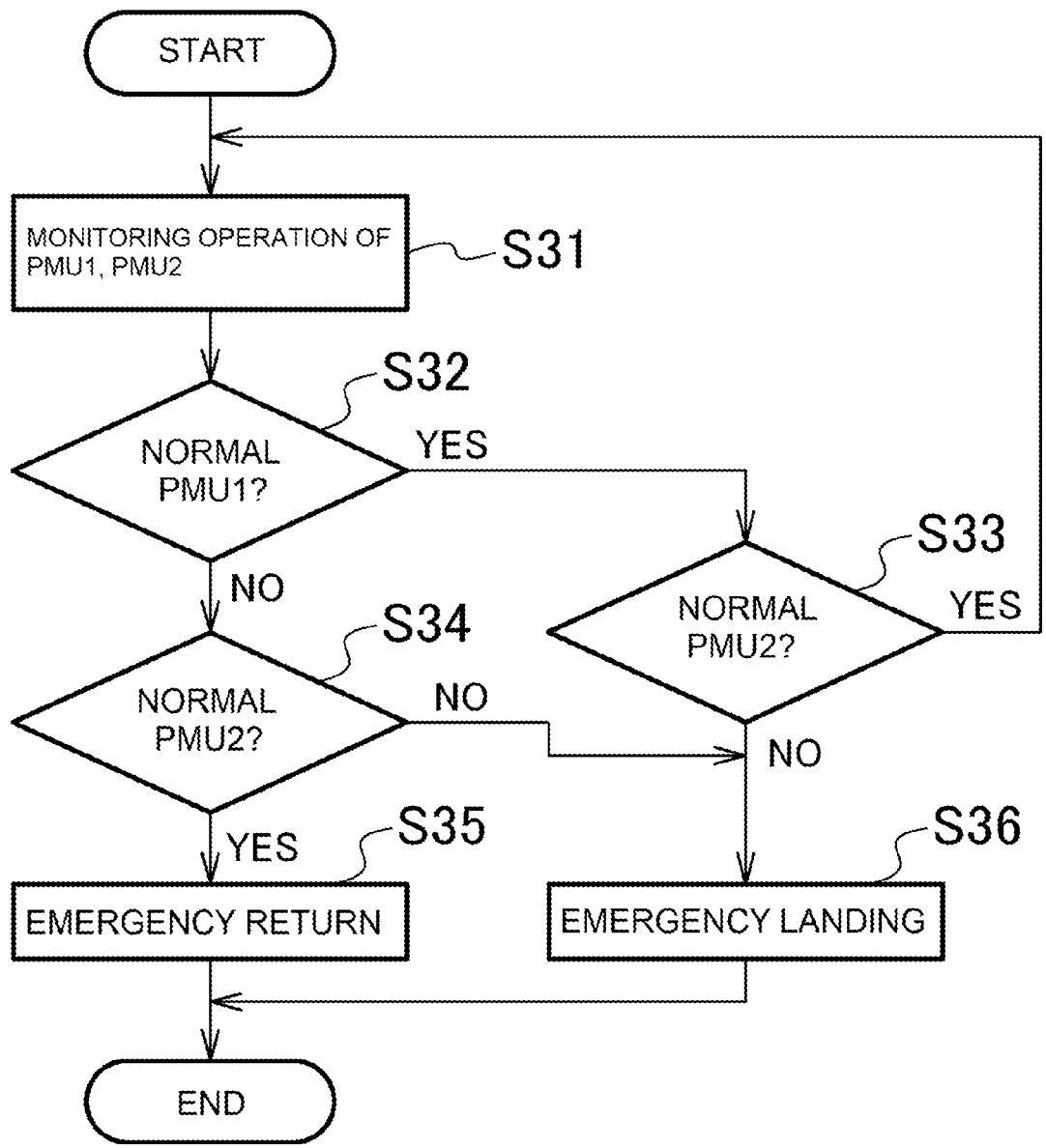
FIG. 6 is a flowchart illustrating an operation of a fourth embodiment of the unmanned aerial vehicle according to the present invention.

In FIG. 6, the flight controller 31 or 32 monitors the operation of the two step-down electric units 41 and 42 (S31). It is determined whether or not one step-down electric unit is normal (S32), and when the one step-down electric unit is normal, it is determined whether or not the other step-down electric unit is normal (S33). When both of the two step-down electric units 41 and 41 are normal, the process returns to step S31, and the normal operation as a drone is continued.

In step S32, in a case where it is determined that one step-down electric unit is not normal, it is necessary to switch the operation to an emergency operation, and the level of the emergency evacuation is determined depending on whether the other step-down electric unit is normal. In this regard, it is determined whether or not the other step-down electric unit is normal (S34), and when the other step-down electric unit is normal, the operation is switched to the emergency return operation (S35). In a case where it is determined in step S34 that the other step-down electric unit is not normal, the emergency landing is made (S36). Further, also in a case where it is determined in step S33 that the other step-down electric unit is not normal, the emergency landing is made (S36).

In the above embodiment, also in a case where it is determined that none of the step-down electric units are normal, the operation can be switched to the emergency landing. However, in this case, the emergency stop may be performed.

Fifth Embodiment

The fourth embodiment illustrated in FIG. 6 is an example in which redundancy is provided for the step-down electric unit. However, a fifth embodiment is an example in which redundancy is provided for the flight controller.

Figure 7:
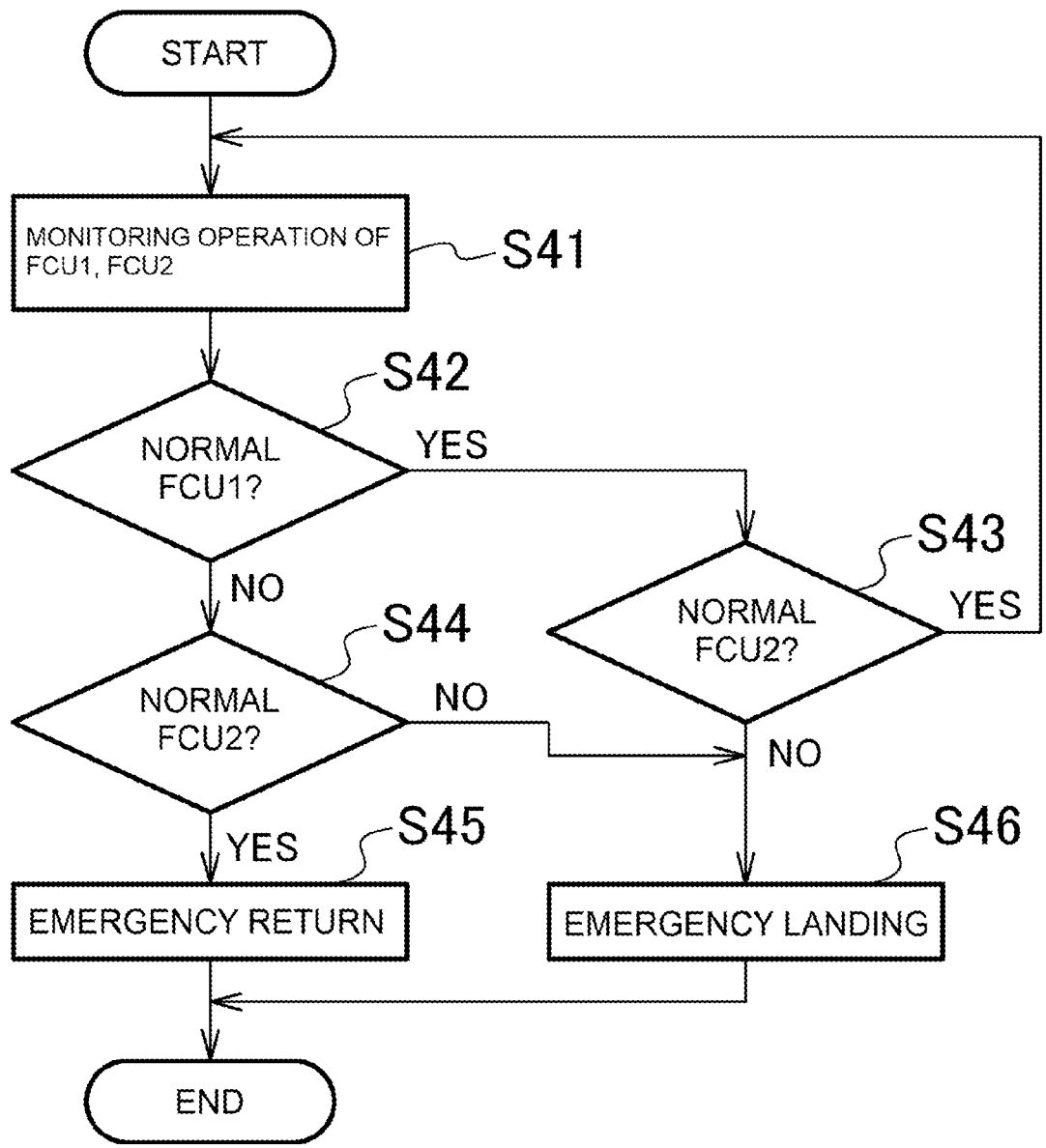
FIG. 7 is a flowchart illustrating an operation example of a fifth embodiment of the unmanned aerial vehicle according to the present invention.

In FIG. 7, the step-down electric unit 41 and 42 monitor the operations of the two flight controllers 31 and 32 (S41). As viewed from the flight controllers 31 and 32, the step-down electric units 41 and 42 are external monitoring units which monitor the operations of the flight controllers 31 and 32. The step-down electric units 41 and 42 determine whether one flight controller is normal (S42), and when it is determined that the one flight controller is normal, the step-down electric units 41 and 42 determine whether the other flight controller is normal (S43). When both of the two flight controllers 31 and 32 are normal, the process returns to step S41, and the normal operation as a drone is continued.

In step S42, in a case where it is determined that one flight controller is not normal, it is necessary to switch the operation to an emergency operation, and the level of the emergency evacuation is determined depending on whether the other flight controller is normal. In this regard, it is determined whether the other flight controller is normal (S44), and when the other flight controller is normal, the operation is switched to the emergency return operation (S45). In a case where it is determined in step S44 that the other flight controller is not normal, the emergency landing is made (S46). Further, also in a case where it is determined in step S43 that the other step-down electric unit is not normal, the emergency landing is made (S46).

Further, as illustrated in FIG. 9, the flight controllers 31 and 32 are communicably connected by a sonar, a barometric pressure sensor, an IR transmitter, an obstacle detection camera, a multi-spectral camera, and the six-axis sensor 50 via controller area networks 1 and 2 (CANs 1 and 2). That is, this unmanned aerial vehicle is also multiplexed for the CANs 1 and 2. In the same drawing, the sonar and the six-axis sensor 50 are multiplexed, and the barometric pressure sensor, the IR transmitter, the obstacle detection camera, and the multi-spectral camera are connected as one configuration to two flight controllers 31 and 32. Incidentally, the number of the configurations connected to the CANs 1 and 2 is not limited to this. Further, the number of CANs may be plural and may be 3 or more.

In a case where at least one of the CANs 1 and 2 is abnormal, one emergency evacuation operation of the emergency return, the emergency landing, and the emergency stop is performed. According to this configuration, even in a case where an abnormality occurs in one of the CANs 1 and 2, the emergency operation can be performed safely by acquiring surrounding information of the flight vehicle by the other of the CANs 2 and 1.

In the above embodiment, also in a case where it is determined that none of the flight controllers are normal, the operation can be switched to the emergency landing. However, in this case, the emergency stop may be performed.

[Modification of Unmanned Aerial Vehicle]

The unmanned aerial vehicle according to the present invention may be configured as follows.

As in the embodiment illustrated in FIG. 3, in a case where the storage amount detection units 254 and 264 are provided, a detection signal is output due to a decrease in the storage amount, and the emergency return is performed, the attitude control operation around at least one axis of the attitude control device of the drone may be limited. For example, the drone has a function to simultaneously control the attitude of the rotation and progress of two or more axes such as the simultaneous operation of the forward movement and the yaw direction rotation and the simultaneous operation of the forward movement and the ascent. However, when two or more axes are controlled simultaneously, a higher current is required for the motor, and the amount of electricity stored in the batteries 25 and 26 is consumed quickly. In this regard, the emergency return is performed by a power saving mode that limits the attitude control operation in a part of the six axes, for example, the yaw direction, and the amount of electricity stored the battery packs 25 and 26 is saved.

Further, the power saving mode may be a mode in which a part of the attitude control is relaxed. Specifically, for example, in the power saving mode, an angle after target acceleration or at target pitch may be changed to a value smaller than that in the normal power mode. Further, a target speed may be changed to a smaller value. Further, a target upward speed, that is, the target thrust at which the thrust of all rotor blades 101 increases may be changed to a smaller value. Further, a target angular velocity, that is, the target of each angular velocity of pitch, roll, and yaw may be changed to a smaller value.

In a case where a drone loaded with chemicals such as an agricultural drone makes the emergency return by the above power saving mode, the drone may return spraying the remaining chemicals to the unsprayed area, so that the load on the drone is reduced, and the drone can return more safely.

As already described, safety is strictly required for autonomous agricultural drones. Similarly, the battery used in such a drone is necessarily a reliable battery with guaranteed quality. In this regard, in a case where a non-standard battery of which the quality is not guaranteed is mounted on a drone or other mobile body, it is preferable to detect that fact and prohibit charging/discharging of the battery. For example, in a case where an authentication chip is built into the battery, and the drone cannot detect the authentication chip, the power supply line is controlled to remain off so that the battery cannot be used.

In order to prevent the battery from igniting, it is preferable to provide an overcurrent prevention function that detects an overcurrent which induces ignition to cut off the power supply.

It is preferable to provide a battery temperature protection function that detects the increase of the inner temperature of the battery to interrupt the flight and that detects a high temperature state or a low temperature state to interrupt charging.

It is preferable to provide an overcharge prevention function that stops charging before reaching overcharge including overvoltage of the battery.

The drone is provided with a crash detection function and a collision detection function, and in a case where a detection signal is output by these detection functions, the battery mounted at that time may be made unusable by cutting off the power supply.

REFERENCE SIGNS LIST

1 Drone (unmanned aerial vehicle)
2 Power supply system
21 Motor
22 Power supply control unit
25 Battery
26 Battery
27 Battery pack
28 Battery pack
31 Flight controller
32 Flight controller
41 Step-down electric unit
42 Step-down electric unit
221 Switch
252 Monitoring unit
262 Monitoring unit

The invention claimed is:

1. An unmanned aerial vehicle driven by an electric motor, comprising: a plurality of batteries as a drive power source for the electric motor, wherein
the plurality of batteries are connected in parallel and each include a monitoring unit to detect an abnormality or deterioration of the corresponding battery and a storage amount detection unit to detect a storage amount of the corresponding battery,
the unmanned aerial vehicle is configured to perform a plurality of emergency evacuation actions which are different depending on the storage amount of each battery,
an operation is switched to one of the plurality of emergency evacuation operations when a detection signal is output from the monitoring unit, and
the operation is switched to a first emergency evacuation operation according to the storage amount detected by the storage amount detection unit of a second battery when the storage amount detected by the storage amount detection unit of a first battery falls below a specified amount.

2. The unmanned aerial vehicle according to claim 1, wherein the emergency evacuation operations include performing an emergency return, an emergency landing, and an emergency stop in order when the storage amount detected by the storage amount detection unit of the second battery decreases.

3. The unmanned aerial vehicle according to claim 2, wherein the emergency return is performed in a power saving mode.

4. The unmanned aerial vehicle according to claim 3, wherein the power saving mode is performed by restricting or releasing a part of a posture control.

5. The unmanned aerial vehicle according to claim 3, wherein the power saving mode restricts a control in a yaw direction.

6. The unmanned aerial vehicle according to claim 3, the unmanned aerial vehicle further comprising:
a chemical tank storing chemical liquid for spraying; and
a chemical nozzle discharging the chemical liquid;
wherein the unmanned aerial vehicle flies during the power saving mode while discharging the chemical liquid.

7. An unmanned aerial vehicle driven by an electric motor comprising:
a plurality of batteries as a drive power source for the electric motor, wherein
the plurality of batteries are connected in parallel and each include a battery monitoring unit in each battery to detect an abnormality or deterioration of the corresponding battery, a storage amount detection unit to detect a storage amount of the corresponding battery, and a detection unit monitoring unit to monitor an operation of the storage amount detection unit,
the unmanned aerial vehicle is configured to perform a plurality of emergency evacuation actions which are different depending on the storage amount of each battery,
an operation is switched to one of the plurality of emergency evacuation operations when a detection signal is output from the battery monitoring unit, and
the operation is switched to a first emergency evacuation operation when the detection unit monitoring unit of a first battery detects an abnormality in the operation of the storage amount detection unit.

8. The unmanned aerial vehicle according to claim 7, wherein the operation is switched to the first emergency evacuation operation when the storage amount of each battery detected by each storage amount detection unit falls below a specified amount.

9. An unmanned aerial vehicle, comprising:
a plurality of rotor blades;
a plurality of electric motors individually rotating and driving each of the plurality of rotor blades;
a plurality of batteries as a power source for the electric motors;
a plurality of distribution units adjusting a power of each of the batteries to appropriate voltages and distributing the power to each of the electric motors; and
monitoring unit monitoring the plurality of distribution units;
wherein the unmanned aerial vehicle is configured to perform a plurality of emergency evacuation actions which are different depending on the storage amount of each battery,
wherein the monitoring unit monitors operation of the plurality of distribution units, and
wherein an operation is switched to a first emergency evacuation operation when an abnormality occurs in at least one of the plurality of distribution units.

10. The unmanned aerial vehicle according to claim 9, wherein the emergency evacuation operation is an emergency return.

11. The unmanned aerial vehicle according to claim 9, wherein the emergency evacuation operation is an emergency landing or an emergency stop.

12. An unmanned aerial vehicle, comprising:
a plurality of rotor blades;
a plurality of electric motors individually rotating each of the plurality of rotor blades;
a plurality of batteries as a power source for the electric motors;
a distribution unit adjusting a power of each of the plurality of batteries to appropriate voltages and distributing the power to each of the electric motors; and
a plurality of flight controllers controlling a flight of the unmanned aerial vehicle,
wherein the unmanned aerial vehicle is configured to perform a plurality of emergency evacuation actions which are different depending on the storage amount of each battery
wherein the plurality of flight controllers monitor each other or are monitored by an external monitor, and
wherein an operation is switched to a first emergency evacuation operation when an abnormality occurs in at least one of the plurality of flight controllers.

13. The unmanned aerial vehicle according to claim 12, wherein the emergency evacuation operation is an emergency return.

14. The unmanned aerial vehicle according to claim 12, wherein the emergency evacuation operation is an emergency landing or an emergency stop.

15. An unmanned aerial vehicle comprising:
a plurality of rotor blades;
a plurality of electric motors individually rotating each of the plurality of rotor blades;
a plurality of batteries as a power source for the electric motors;
a distribution unit adjusting a power of each of the batteries to appropriate voltages and distributing the power to each of the electric motors;
a flight controller controlling a flight of the unmanned aerial vehicle; and
a plurality of control communication lines connected to the flight controller for communicating with a sensor,
wherein the unmanned aerial vehicle is configured to perform a plurality of emergency evacuation actions which are different depending on the storage amount of each battery,
wherein an operation is switched to a first emergency evacuation operation when an abnormality occurs in at least one of the plurality of the control communication lines.

16. The unmanned aerial vehicle according to claim 15, wherein the sensor includes at least one of a sonar, a barometric pressure sensor, a camera, and a six-axis gyro sensor.

17. An unmanned aerial vehicle driven by an electric motor, comprising:
a plurality of batteries as a drive power source for the electric motor,
wherein the plurality of batteries are connected in parallel to each other and each include a monitoring unit to detect an abnormality of the corresponding battery and an abnormality or deterioration of the corresponding battery, and a block unit to block an output of the corresponding battery when a detection signal is output from the corresponding monitoring unit,
wherein the unmanned aerial vehicle is configured to perform a plurality of emergency evacuation actions which are different depending on the storage amount of each battery,
wherein an operation is switched to a first emergency evacuation operation in a power saving mode, powered by other batteries, when an output of at least one of the plurality of the batteries is blocked by at least one of the block units, respectively, and
wherein the power saving mode is performed by restricting a posture control of the first emergency evacuation operation of one rotating axis, or by correcting an operation target value to a value smaller than a normal mode.

\* \* \* \* \*